United States Patent [19]

Augustyniak

[11] Patent Number: 4,861,465
[45] Date of Patent: Aug. 29, 1989

[54] ANTI-REVERSE SIPHONING WATER CIRCULATING SYSTEM FOR AQUARIUMS

[76] Inventor: Stanley D. Augustyniak, 4029 Fern Ave., Lyons, Ill. 60534

[21] Appl. No.: 148,051

[22] Filed: Jan. 25, 1988

[51] Int. Cl.[4] ............................................. A01K 63/00
[52] U.S. Cl. .................................... 210/109; 210/169; 210/416.2; 119/5; 137/143; 137/216
[58] Field of Search ............... 137/123, 130, 142, 143, 137/147, 215, 216; 210/169, 416.2, 109, 505; 119/5

[56] References Cited

U.S. PATENT DOCUMENTS

| | | | |
|---|---|---|---|
| 758,188 | 4/1904 | Miller | 137/216 |
| 3,688,907 | 9/1972 | Oravec | 210/169 |
| 4,684,462 | 8/1987 | Augustyniak | 210/169 |
| 4,708,792 | 11/1987 | Takarabe et al. | 210/505 |

FOREIGN PATENT DOCUMENTS

| | | | |
|---|---|---|---|
| 200170 | 7/1908 | Fed. Rep. of Germany | 119/5 |
| 62-91211 | 4/1987 | Japan | 210/169 |
| 2074292 | 10/1981 | United Kingdom | 137/216 |

Primary Examiner—Peter Hruskoci
Assistant Examiner—Christopher Upton
Attorney, Agent, or Firm—John J. Kowalik

[57] ABSTRACT

Apparatus for a recirculating aquarium water supply system having a tank with a discharge control device for maintaining the level of the water in the tank and incorporating an overflow receptacle in the tank and a prefilter receptable outside the tank filled by a siphon from the overflow receptacle, the prefilter receptacle having a sponge-like filter serving as a divider fitted thereinbetween the discharge of the siphon and drain of the prefilter receptacle, the drain discharging onto a diffuser plate which drips the water onto a cylindrical filter made from a wrapping of fibrous batting material which is saturated by the water and drips through a gravel filled container which discharges through a labyrinthian path in several interconnected chambers to a pump container from which the water is pumped back into the tank by a U-shaped nozzle which below the bend of the U has a series of slots formed therein for discharging a slow moving spray over the top layer of water in the tank, the water also discharging through the lower end of the leg of the nozzle. The nozzle serves as a water level maintaining device by aspirating air through said slots to prevent the nozzle from acting as a reverse siphon when the pump stops.

45 Claims, 3 Drawing Sheets

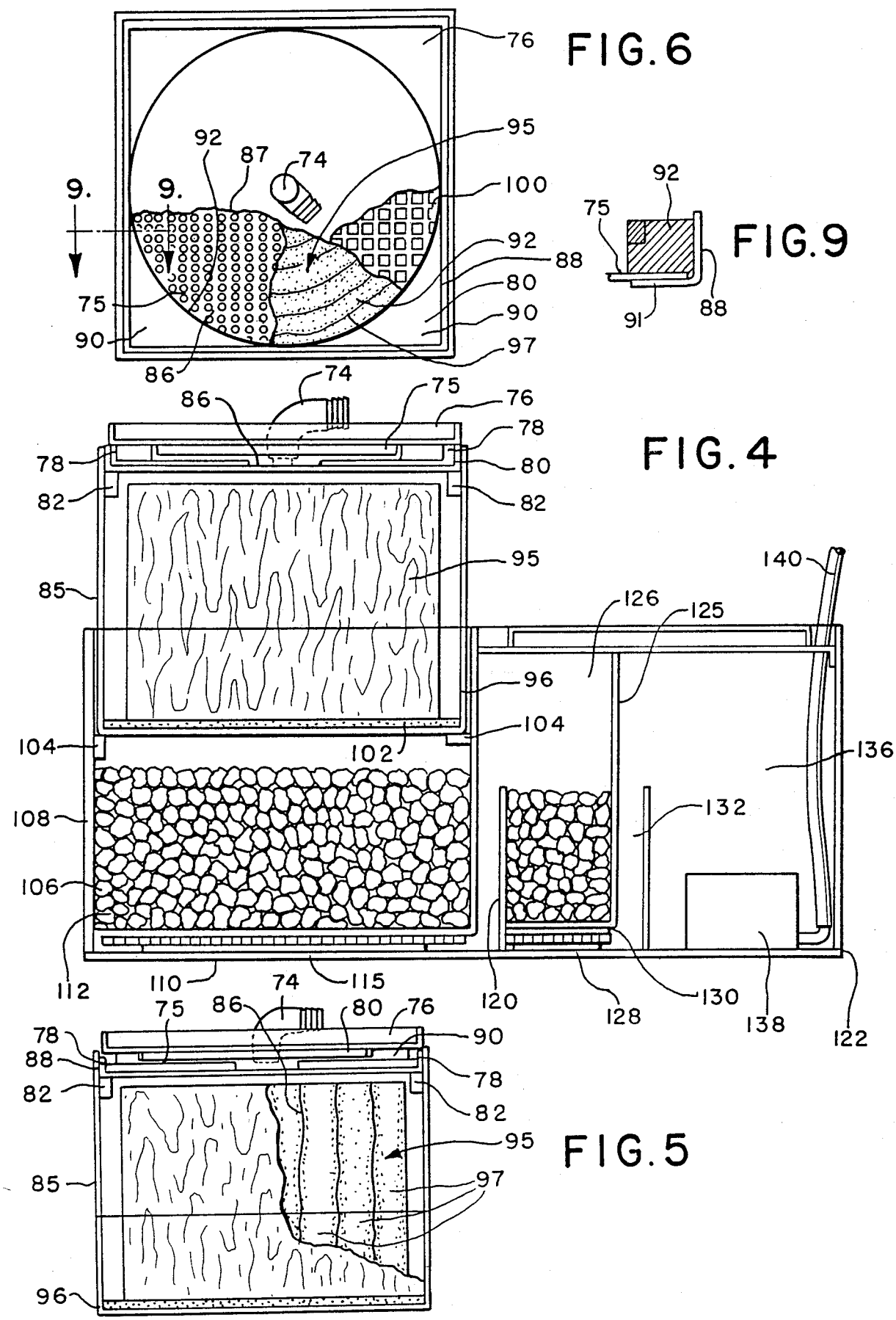

4,861,465

ANTI-REVERSE SIPHONING WATER CIRCULATING SYSTEM FOR AQUARIUMS

BACKGROUND OF THE INVENTION

This invention relates to components for use in aquariums arranged in a novel system for filtering and aerating the water and preventing emptying of the aquarium during power failures or malfunctioning of the pump.

It is essential that environmental and bacteriological conditions be maintained in an aquarium tank, and the water held at constant level. The water must be cleaned and have sufficient oxygen to sustain the marine life. It is important to recirculate the water continuously.

In present systems the aquarium water is normally drained from the tank while the top layer of water is skimmed of debris. The water recirculates through filters and returns to the tank. Thus a clean supply of water is introduced into the tank. This presupposes that all of the components are operating properly and that the filters are maintained clean. Reference is made to a recently issued U.S. Pat. No. 4,684,462, where the water is thus circulated.

Various conventional systems remove the water from the bottom of the tank, thus leaving the surface of the water contaminated with debris and the like.

Conventionally in aquarium water purifying systems an electric pump is used for transfering the water from the filtering systems to the tank. As the filtered water is returned to the tank, it is replaced in the filtering system with unfiltered water from the tank by a siphoning tube. The siphoning tube thus serves as an essential conduit in the filtering and circulation system. The inlet to the tank is normally a U-shaped tube which simulates a siphon and can reverse drain.

In the event of power failure or the pump failing, the water in the tank will reverse drain through the U-shaped inlet tube which acts as a siphon. The inlet tube is hooked over the top edge of the tank and has one end extended to the bottom of the tank and the other end extends along the exterior of the tank and is connected to the pump. Once the pressure is removed, the water will gravitationally flow through the pump and into the filter containers positioned beneath the tank. Eventually the water overflows the filter tank and drains onto the floor therebelow.

In various systems currently in use in order to disperse the water over the filter media is customary to use a spray which is normally motorized. These devices have been found unsatisfactory since they become clogged and require constant maintenance.

SUMMARY OF THE INVENTION

A principal object is to provide a novel and improved recirculation and filtering system which obviates the shortcomings of the previous systems and which may be applied to aquarium tanks presently in use.

A further object is to provide in such a system a novel and improved siphoning structure in which the top surface of water is discharged from the tank into a compartment within the tank and is therefrom siphoned into a compartment outside the tank and passed through a filter which subdivides the outer compartment into inlet and outlet sections, the water from the tank being siphoned into the inlet section and passed therefrom through a filter into the outlet section on the way to a drain communicating with a primary filtering system.

The invention comprehends the provision of an inlet device discharging filtered water into one end of a tank and a water discharge device at the opposite end of the tank, the water inlet device comprising a U-shaped tube which has an outer leg connected to the pump and an inner leg extended to adjacent of the bottom of the tank, the inner leg having a series of narrow slots at its upper end which are partially immersed in the water and partially extending above the top surface of the water in the tank and functioning to discharge some of the water being pumped in into the top layer of the water in the tank to cause the surface water to ripple for aeration and to move the debris on the top surface of the water in the tank toward the discharge device before the debris becomes water-logged and sinks to the bottom of the tank.

Another object is to devise such an inlet tube which, if the pump should fail or power is interrupted, will prevent the tube from functioning as a siphon.

Another object is to provide a novel system for controlling water flow and purification which is adaptable to tanks in use without the neccesity of any modification thereof.

A still different object is to provide a novel filtering system in which the water being discharged from the tank is distributed over a diffuser which comprises a plate with a series of minute holes positioned to drip the water over a primary filter formed from a batting of filtering material rolled into a compact cylinder to provide extensive bacteriological support areas and filtering surfaces. The invention also provides novel labyrinthian, gravel filled passages for further filtering the water from the primary filter.

A different object is to provide a novel discharge device for the water in the tank in which such water is siphoned into a container divided into two compartments by an upright positioned removable filter sponge, the water entering one compartment and passing through the filter into the second compartment and thence into a drain in the side of the second compartment.

These and other objects and advantages inherent in and encompassed by the invention will become more apparent from the specification and the drawings, wherein:

FIG. 4 is a side elevational view of the filtering system;

FIG. 5 is a side elevational view of the primary filter with parts broken away and shown in vertical section to illustrate the construction thereof;

FIG. 6 is a top view of the primary filter with parts broken from the top to the bottom thereof;

FIG. 9 is an enlarged vertical section taken essentially on line 9—9 of FIG. 6.

DESCRIPTION OF THE INVENTION

Figure 1:
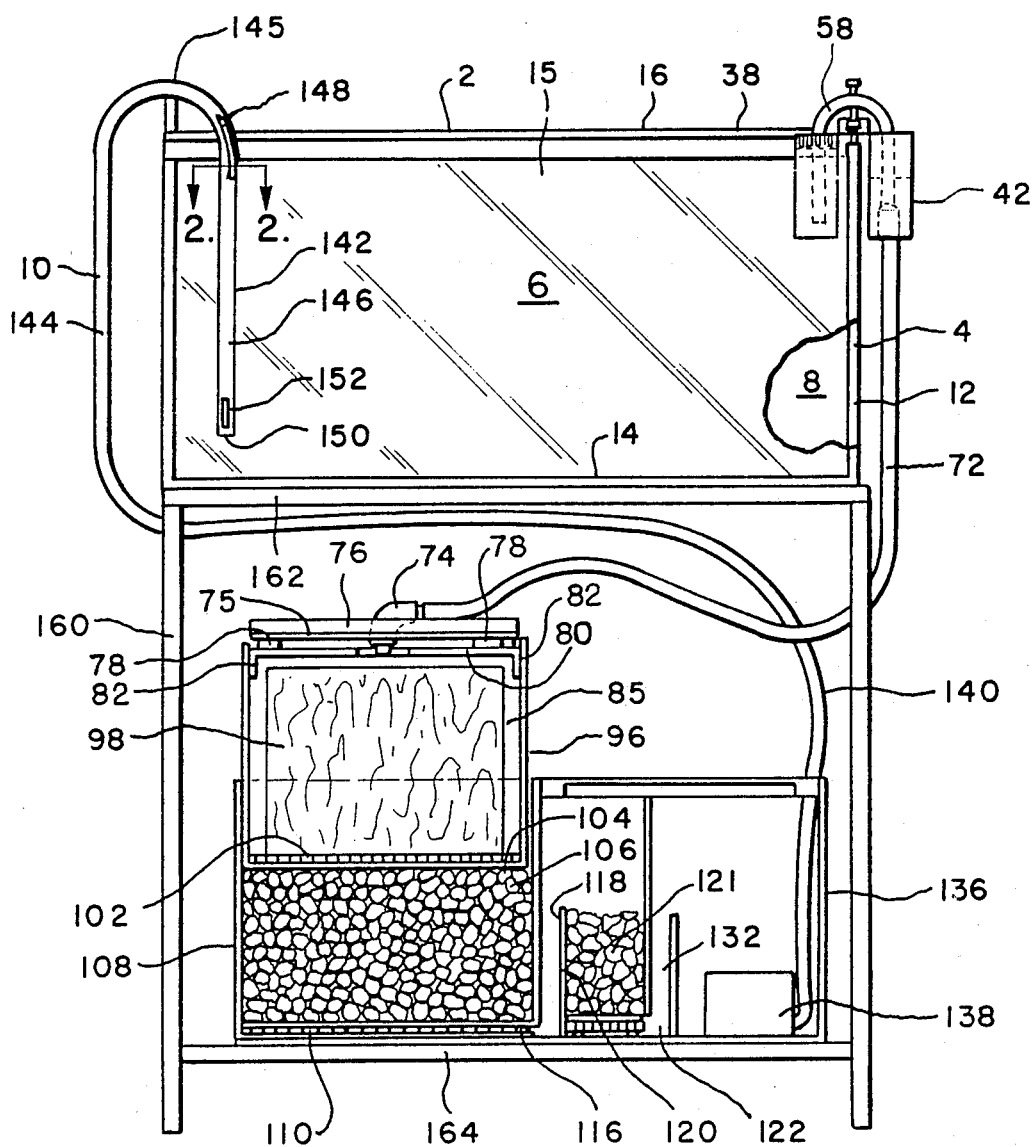
FIG. 1 is a side elevational view of an aquarium incorporating the novel water level control and filtering system.
Figure 2:
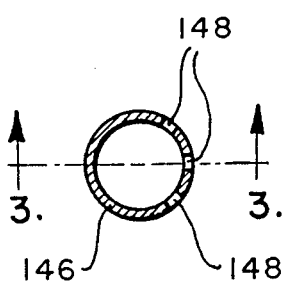
FIG. 2 is an enlarged cross-section of the inlet tube taken substantially on line 2—2 of FIG. 1.
Figure 3:
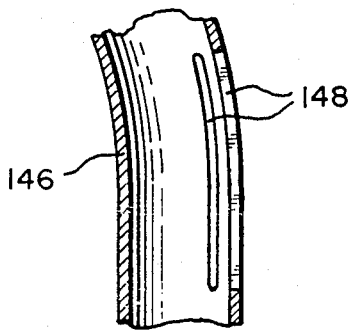
FIG. 3 is a longitudinal section taken substantially on line 3—3 of FIG. 2.
Figure 8:
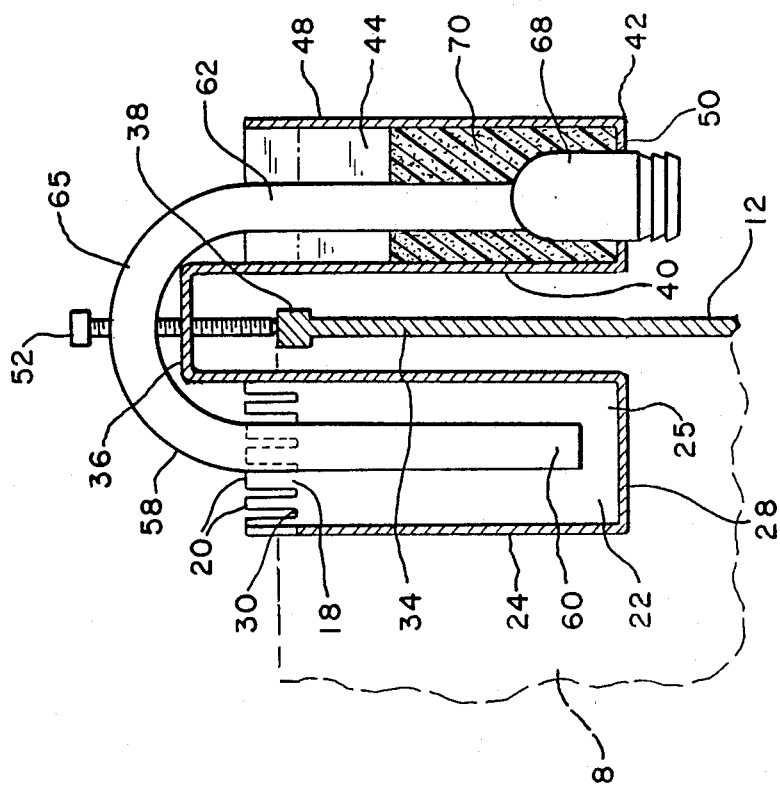
FIG. 8 is an enlarged end elevation of the discharge device.
Figure 7:
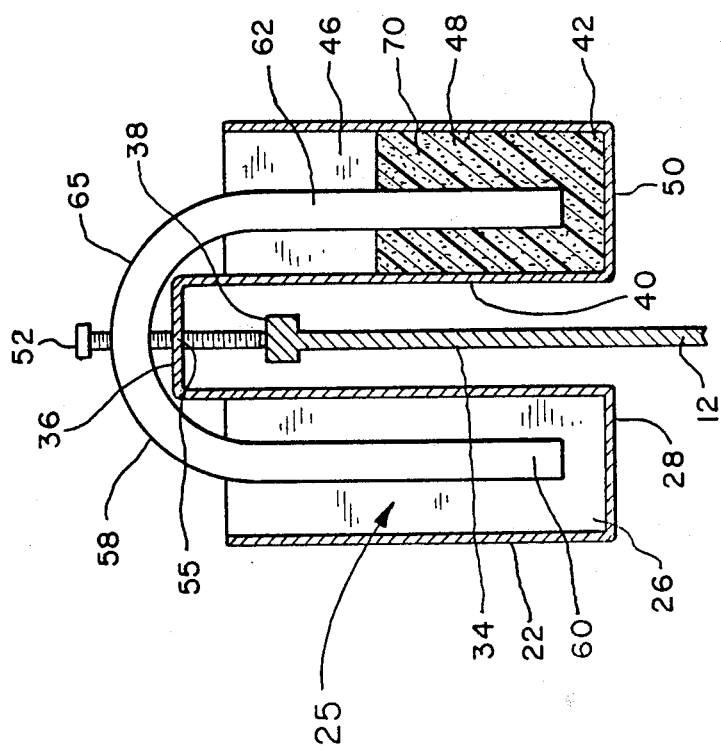
FIG. 7 is a vertical section of the tank discharge device.

In the associated drawings 2 represents an aquarium having a tank 4 which is generally of rectangular form having side walls 6 and 8 and end walls 10 and 12 and a bottom wall 14.

The tank is filled with water designated 15 having an upper surface layer 16. The top level of the water extends slightly above the bottom ends 18 of a series of dentals 20,20 formed as part of the upper ends if inner wall 22 and end walls 24,26 of an overflow receptacle or container 25 which has a bottom 28. The water flow over the coplanar top edges 30 of walls 22-26 between the teeth 20,20 through slots 32 formed therebetween. The teeth or dentils 20 prevent large particles of debris from entering the container 25 as the inflow of the surface layer of water 16 fills the container 25.

The outer wall 34 of the inner container 25 is connected to a bridge member 36 which straddles the upper ledge 38 of the tank wall 12 and the bridge is connected to the upper edge of an inner wall 40 of the outer container 42. The container 42 has end walls 44,46 and outer wall 48 and a bottom wall 50.

The inner and outer containers 25,42 flank the wall 12 and are supported by adjustable means in the form of bolts which are threaded at 55 through the bridge and seat on the upper edge 38 of wall 12. Thus the height of the containers is adjustable by threading and unthreading the bolts thereby controlling the level of the water in the tank.

A U-shaped siphon tube 58 connects the inner and outer containers and has its inner leg 60 disposed in the inner container and its outer leg 62 in the outer container with the bight portion 65 interconnecting the legs and extending over the upper edge 38 of tank wall 12 and resting upon the bridge.

Once the siphon is actuated in usual manner the water filling the inner container will siphon and drain into the outer container as long as there is a sufficient amount of water in the inner container.

The drain for the outer container is indicated at 68 and is formed on the end wall 44 spaced above the bottom wall 50 to provide a reservoir of water to maintain the siphon as is well known.

A sponge like porous filter made of suitable plastic is positioned intermediate the drain and the outlet leg 62 of the siphon 58. This filter 70 is compressed between the inner and outer walls 40, and 48 and seats upon the bottom wall 50 of the outer container. Preferably the filter is soft and extends a substantial distance upwardly and may even reach the top of the outer container. Thus if an excess amount of water may be confined in the inlet section of the outer container the filter 70 may slightly compress and expand in a pumping action to expell excess debris and allow the water to flow therethrough more freely. The drain is provided with an elbow connected to a drain tube or conduit 72 which extends beneath the tank and is connected to an elbow 76 which is mounted on a cover 76 at its center to drain the water onto a horizontal diffuser plate 75 spaced therebeneath.

The cover is seated at its four corners on support blocks 78 secured to the corners of a tray 80 which in turn seats on corner blocks 82 secured to the corners of a filtration tank 85. The diffuser tray is provided with the plate 75 having a plurality of small holes 87. The plate or screen 75 is fitted within the side walls 88 of the tray. Above the screen 75 there are provided corner braces 90 which have arcuate inner edges 92 subtending the corners of the tray. The corner braces seat on inturned flanges 91 over the screen 75. The flanges 91 are along the lower edges of the side walls 88 of the square tray. The four braces 92 together form a circular water-confinement area of a diameter approximately equal to the diameter of a cylindrical filter 95 positioned in axial alignment with the confinement area within a container 96.

The filter is composed of a roll of batting 97 made of strands of intermeshed plastic material or the like simulating cotton and is about ¼ inch thick and about 10 to 12 inches in width. These dimensions are not critical. The batting is rolled into a cylinder with a plastic mesh or netting 98 on its inner and outer sides.

The water drips through the diffuser holes 86 onto the filter 95 and saturates it. The filtered water drips out of the bottom of the filter through holes in a supporting grid panel 102 which seats on corner blocks 104 secured to the corners of the container 106 into which the lower end of the filter container 96 fits.

The container 106 has four side walls 108 and a bottom wall 110 and contains gravel 112 which is supported by a porous plate 115 which allows the water to pass therethrough for exit through a bottom slot 116 in one wall 108 into a chamber 118 formed by a partition wall 120 secured to opposing walls of a container 122 which is connected to one side wall of the container 106. The water rises to the height of the partition wall 120 and spills thereover into another chamber 121 formed by wall 125 secured to opposing walls 126 of container 122. The wall 125 is spaced at its bottom edge from the bottom wall 128 of container 122 to form a slot 130 which discharges the water into another chamber 132 formed by a portion of wall 134 connected to the bottom wall 128 and side walls 126.

The water rises in chamber 132 and cascades over the upper edge of the partition wall 134 into the pumping chamber 136 win which the pump 138 is located for pumping the water through a conduit or hose 140 into a discharge spigot, tube or nozzle 142 which is of inverted U-shape having its outer leg 144 secured to the conduit 140 and having its bight portion 145 draped over the upper edge of the tank and having its inner leg 146 extending into the tank to adjacent the bottom thereof.

The upper end of the inner leg at its juncture with the bight portion is longitudinally slotted at 148 to form on the inner side a series of circumferentially spaced elongated apertures through which the pressurized water exhausting from the pump is caused to spray into and over the upper layer 16 to aerate the water in the tank and form or develop a surface current on the top of the water in the tank toward the discharge unit at the opposite end of the tank to carry the top debris into the discharge unit.

The lower end of the inner leg is closed at 150 and thereabove the inner leg is formed with a plurality of elongated slots 152 which cause the water pumped therein to gush into and agitate the lower strata of the tank water. The gushing of the water through slots 152 is ameliorated by the discharge of the water through the upper slots 148. These upper and lower slots may be varied in dimension to obtain the desired results as to flow rates, gushing etc. in accordance with the requirements of the tank and dependent on its dimensions.

It will become readily apparent that should the pump malfunction or if the power should fail, without the slots 148 the inlet tube 142 would become a siphon and would drain the tank to the bottom end of the leg 146. However, in the present structure as soon as the reverse siphoning occurs, air will rush into the nozzle through the apertures 148 and the siphon would be broken or cease to operate and thus prevent the tank from being emptied of water.

I claim:

1. Apparatus for use in a recirculating purifying system of an aquarium having a tank containing a body of water comprising:
   means for withdrawing water from the tank, and means for replenishing the withdrawn water into the tank, comprising:
   a U-shaped nozzle in the form of a siphon having a bight portion and a discharge leg joined in curved juncture with the bight portion, said leg extending into the water in the tank and having a lower end positioned adjacent to the bottom of the tank, and
   means on said nozzle comprising apertures in the nozzle at the curved juncture of the bight portion with said discharge leg and positioned above the water level for spraying water onto the top surface of the water in the tank for creating ripples and aerating the water.

2. The invention according to claim 1 and further comprising a columnar shaped biological filter formed as part of said water return means.

3. Apparatus for use in a recirculating purifying system of an aquarium having a tank containing a body of water comprising: means for withdrawing water from the tank, and means for replenishing the withdrawn water into the tank, comprising:
   a nozzle in the form of a siphon having a discharge leg extending into the water in the tank and having a lower end positioned adjacent to the bottom of the tank, and
   means on said discharge leg for spraying water into the top surface of the water in the tank for creating ripples and aerating the water,
   said water withdrawing means comprising a receptacle hung from the tank and having a side wall with a drain opening elected above the bottom of the receptacle, and
   filter means within the receptacle between the drain and aid water withdrawing means, and
   said water withdrawing means comprising a conduit extending from the tank to said receptacle.

4. The invention according to claim 3 and
   a filter unit disposed beneath the tank,
   a conduit connecting the drain to said filter unit,
   said replenishing means comprising a return container with a pump therein, and
   a second conduit connecting said pump with said nozzle.

5. The invention according to claim 4 and said filter unit comprising a strip of filtering material with a strip of perforated netting flanking said material and wrapped therewith into a cylinder positioned axially upright, and
   said first-mentioned conduit positioned to deliver water onto the top end of said cylinder.

6. The invention according to claim 5 and further comprising a diffuser positioned above the cylinder and having a plurality of apertures for passing the water therethrough over the entire upper extent of said cylinder.

7. For use in a recirculating water purifying system for aquarium tank, a filter within said system comprising a strip biologically supportive filtering material wound in overlapping layers with an intervening netting to form a cylindrical shaped body having an inlet at one end and an outlet at the other end, and
   connected to said outlet for discharging the water into a tank and comprising a nozzle having means for spraying water into the top layer of water in the tank, and said
   nozzle comprising a U-shaped tube hung over the edge of the tank and having inner and outer legs joined by a bight, and said spraying means comprising a series of apertures in said tube at the juncture of the bight with the inner leg,
   said apertures being partially immersed in the water in the tank and partially extending above the water level for directing the spray over the top of the water for creating a turbulence and operative to aspirate air into the tube to prevent reverse siphoning and withdrawal of water from the tank.

8. The invention according to claim 7 and further comprising a diffuser superposed with respect to said inlet end for spreading the water over the entire extend thereof and saturating the filter.

9. The invention according to claim 7 and further comprising said diffuser comprising a flat plate with a series of apertures therein and
   a water-encompassing rim having a diameter substantially equal to that of the cylinder.

10. The invention according to claim 7 and further comprising
    a cover mounted over the diffuser having central water discharge aperture for discharging water at the center of the diffuser from whence it is caused to spread over the entire diffuser within the boundaries of the rim.

11. The invention according to claim 7 and said inner leg having a lower end with apertures for additionally discharging the return water into the lower portion of the tank.

12. Apparatus for incorporation in a recirculating water purifying system for an aquarium having a tank filled with water, the combination:
    means for withdrawing water from the tank,
    water return means connected to said water withdrawing means in a recirculating system for replenishing water in the tank and including a U-shaped discharge tube hung over the edge of the tank and comprising inner and outer legs and an interconnecting bight,
    said inner leg being immersed in said water in the tank, and
    anti-siphoning means for preventing reverse flow of water in said tube as a siphon attendant to malfunctioning of associated water delivery means in said water replenishing means,
    and said anti-siphoning means comprising orifices in said inner leg positioned at least partially above the level of the water in the tank for spraying the return water over the top of the water in the tank for creating a current sweeping debris on the top of the water to the opposite side of the tank,
    and means for withdrawing the water from the tank at substantially the rate as it is replenished mounted on the opposite side thereof in the flow path of said top layer of said water in the tank and comprising an overflow receptacle having water-passage slot means provided therein at the open-topped end thereof, a receiving open topped receptacle having a generally flat bottom and side and end walls,
    siphon tube means for transferring water from said overflow receptacle to said receiving receptacle, a drain connected to one of the side walls of said receiving receptacle spaced from said bottom to provide a reservoir of water in said receiving receptacle for maintaining the siphon filled with water, and a removable filter positioned between said siphon and said drain, said filter being deflectible for pumping water therethrough.

13. Apparatus for incorporation in a recirculating water purifying system for an aquarium having a tank filled with water, the combination:

means for withdrawing water from the tank, water return means connected to said water withdrawing means in a recirculating system for replenishing water in the tank and including a U-shaped discharge tube hung over the edge of the tank and comprising inner and outer legs and an interconnecting bight, said inner leg being immersed in said water in the tank, and anti-siphoning means for preventing reverse flow of water in said tube as a siphon attendant to malfunctioning of associated water delivery means in said water replenishing means, said anti-siphoning means having a series of apertures in said tube at the juncture of the bight with the inner leg partially immersed in the tank and extending above the water level for directing a spray of water over the top of the water in the tank for creating a turbulence and operative to aspirate air into the tube to prevent siphoning of water from the tank, and said return means comprising a bacteriological life-supporting mat of material rolled into a cylinder to provide an extensive filter media, and said cylinder having an inlet and an outlet end, the inlet end being connected to said water-withdrawing means, and said outlet being connected to said water-replenishing means.

14. The invention according to claim 13 and said cylinder being disposed endwise in an upright position, and drain means interconnecting the water-withdrawing means with the inlet end of said cylinder.

15. The invention according to claim 14 and further comprising a diffuser plate between said drain means and said filter for spreading and dripping water onto said filter over the entire inlet end thereof.

* * * * *